United States Patent
Ilyas et al.

(10) Patent No.: US 7,587,860 B1
(45) Date of Patent: Sep. 15, 2009

(54) LANDSCAPER TRELLIS WITH INTEGRATED LIGHT AND PLANT HANGER

(76) Inventors: Aqueelah Ilyas, 10200 Road 737, Philadelphia, MS (US) 39350; Muhammad Ilyas, 10200 Road 737, Philadelphia, MS (US) 39350

( * ) Notice: Subject to any disclaimer, the term of this patent is extended or adjusted under 35 U.S.C. 154(b) by 190 days.

(21) Appl. No.: 11/633,294

(22) Filed: Dec. 4, 2006

(51) Int. Cl.
  *A01G 17/06* (2006.01)
  *A01G 17/04* (2006.01)
  *E04H 17/00* (2006.01)
  *E04H 17/14* (2006.01)
  *E04H 17/16* (2006.01)
  *B21F 27/00* (2006.01)

(52) U.S. Cl. .................. 47/70; 47/44; 47/45; 47/46; 47/47; 256/1; 256/19; 256/21; 256/24; 256/73

(58) Field of Classification Search ............... 47/44–47, 47/70, 4, 67; 248/27.8; 256/1, 19, 21, 24, 256/25, 73; *A01G 17/06, 17/04*
See application file for complete search history.

(56) References Cited

U.S. PATENT DOCUMENTS

| | | | | |
|---|---|---|---|---|
| 932,355 | A * | 8/1909 | Thrasher et al. | 256/26 |
| 1,083,450 | A * | 1/1914 | Lytle | 47/47 |
| 1,336,580 | A * | 4/1920 | Parr | 47/44 |
| 1,487,779 | A * | 3/1924 | Hardy | 47/44 |
| 1,903,122 | A * | 3/1933 | Merz et al. | 47/47 |
| 2,132,568 | A * | 10/1938 | Jacobs | 47/31 |
| 2,997,277 | A * | 8/1961 | Schwartz | 256/24 |
| 3,425,630 | A * | 2/1969 | Fessler, Sr. | 239/208 |
| 4,499,688 | A | 2/1985 | Droll | |
| 5,364,050 | A | 11/1994 | Smith | |
| 5,415,380 | A * | 5/1995 | Sharp | 256/24 |
| D366,532 | S | 1/1996 | Herbst et al. | |
| 5,647,166 | A * | 7/1997 | Neff | 47/45 |
| 6,076,807 | A * | 6/2000 | Spence | 256/1 |
| 6,311,428 | B1 * | 11/2001 | Marino et al. | 47/46 |
| 6,490,825 | B1 * | 12/2002 | Dillon et al. | 47/47 |
| 6,722,637 | B2 * | 4/2004 | Burkart et al. | 256/1 |
| 6,857,247 | B2 | 2/2005 | Adams | |
| 6,976,334 | B1 * | 12/2005 | Bowditch | 47/32 |
| 7,017,299 | B1 * | 3/2006 | Speed et al. | 47/44 |
| 7,216,854 | B2 * | 5/2007 | Bryan | 256/25 |
| 7,354,225 | B1 * | 4/2008 | Cohen | 405/259.1 |
| 2002/0125468 | A1 * | 9/2002 | Fischer | 256/19 |
| 2004/0093792 | A1 | 5/2004 | Avery | |

FOREIGN PATENT DOCUMENTS

GB     2192663 A  *  1/1988

* cited by examiner

*Primary Examiner*—Rob Swiatek
*Assistant Examiner*—Kristen C Hayes
(74) *Attorney, Agent, or Firm*—Kyle Fletcher

(57) ABSTRACT

The present invention relates to a landscaper trellis that would feature basket hangers and a solar light incorporated into its design. The trellis would measure roughly 8 feet long and 8 feet high. The curved framework would consist of two lattice panels stretching between three support poles, and be made of a material comprising treated lumber, durable plastic, or a metal. The invention provides an attractive setting with the ability to hold planters, and provide lighting when necessary anywhere without requiring an external electrical source.

8 Claims, 3 Drawing Sheets

LANDSCAPER TRELLIS WITH INTEGRATED LIGHT AND PLANT HANGER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to a landscaper trellis that has a unique shape and integrated lights and ornate plant hangers.

B. Prior Art

The Adams Patent (U.S. Pat. No. 6,857,247) discloses a coupling element which can be composed of lattice and assembled to support plants.

The Avery Patent Application Publication (U.S. Pub. No. 2004/0093792) discloses a system for supporting plants which is composed of lattice.

The Smith Patent (U.S. Pat. No. 5,364,050) discloses a hanger which includes a bracket with forward and rearward panels, and a connecting panel connecting the upper ends of the forward and rearward panels, to support a bracket on a lattice.

The Droll Patent (U.S. Pat. No. 4,499,688) discloses a plant pot holder which is supported by a lattice type structure.

The Burkart et al. Patent (U.S. Pat. No. 6,722,637) discloses a synthetic fence post with a solar light attachment that can be fastened to another existing fence post or the like.

The Herbst et al. Patent (U.S. Pat. No. Des. 366,532) illustrates a design for lattice work.

BRIEF SUMMARY OF THE INVENTION

The present invention relates to a landscaper trellis that would feature basket hangers and a solar light incorporated into its design. The trellis would measure roughly 8 feet long and 8 feet high. The curved framework would consist of two lattice panels stretching between three support poles, and be made of a material comprising treated lumber, durable plastic, or a metal. The invention provides an attractive setting with the ability to hold planters, and provide lighting when necessary anywhere without requiring an electrical source.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
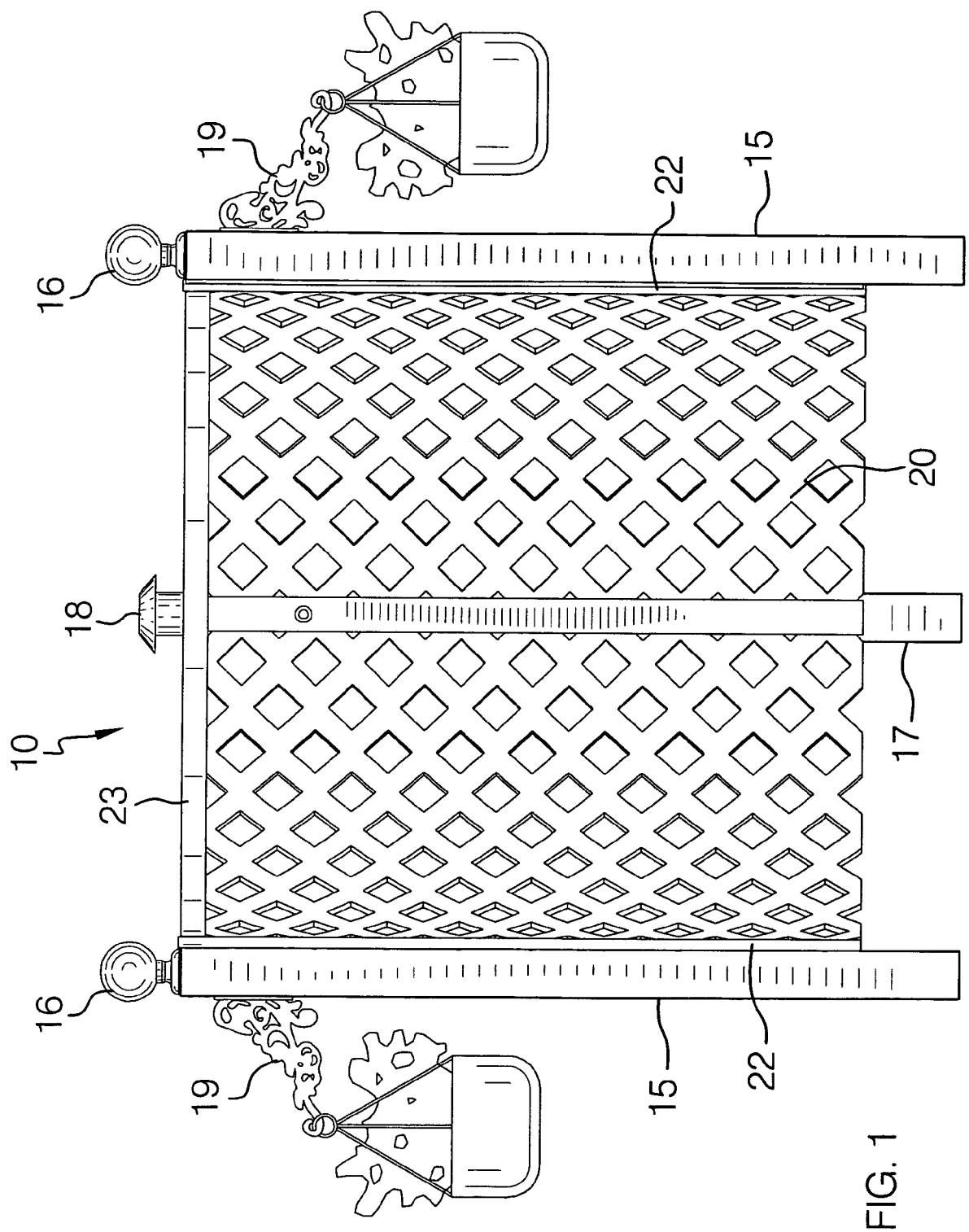
FIG. 1 illustrates a front view of the invention itself.
Figure 2:
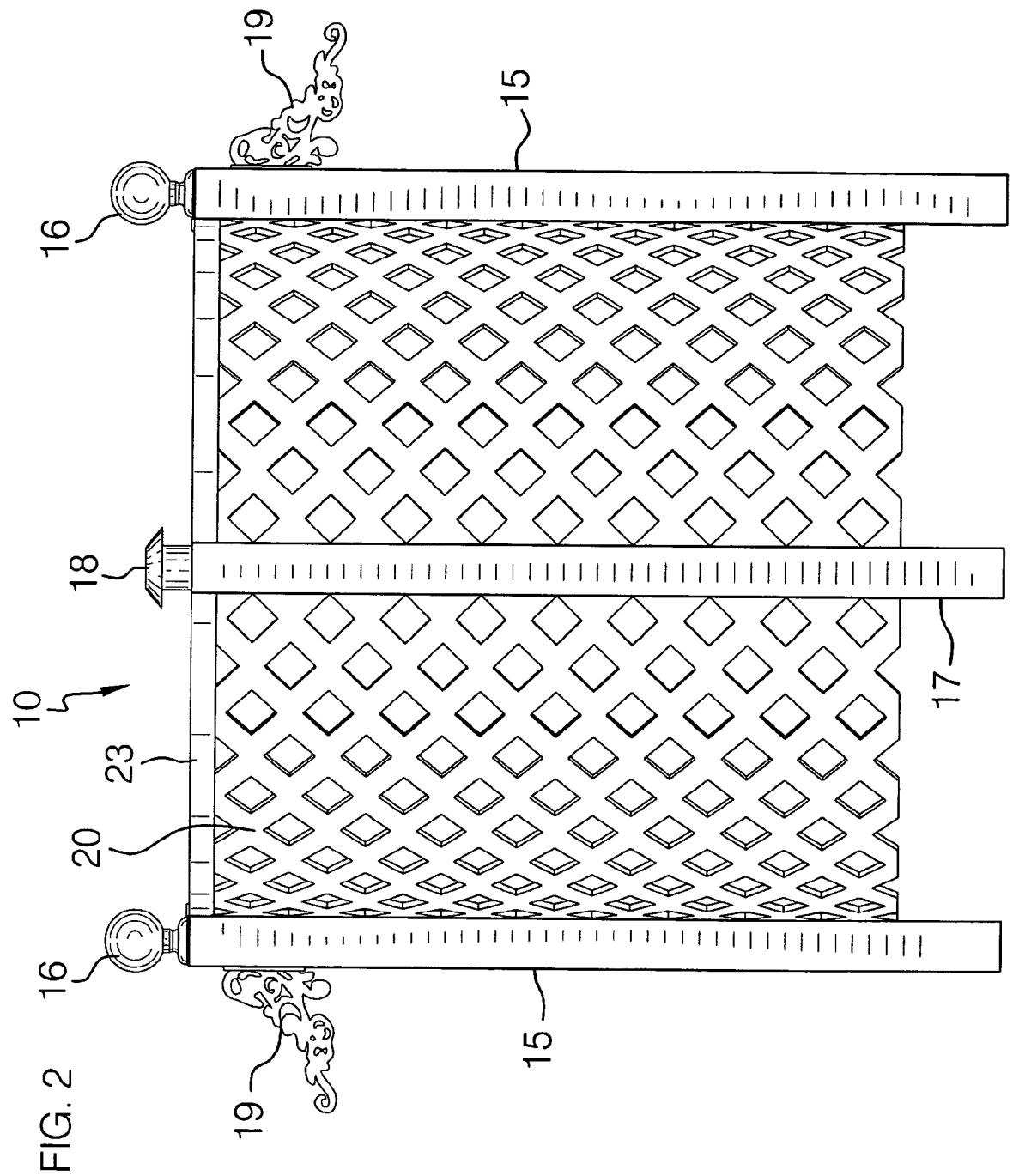
FIG. 2 illustrates a rear view of the invention itself.
Figure 3:
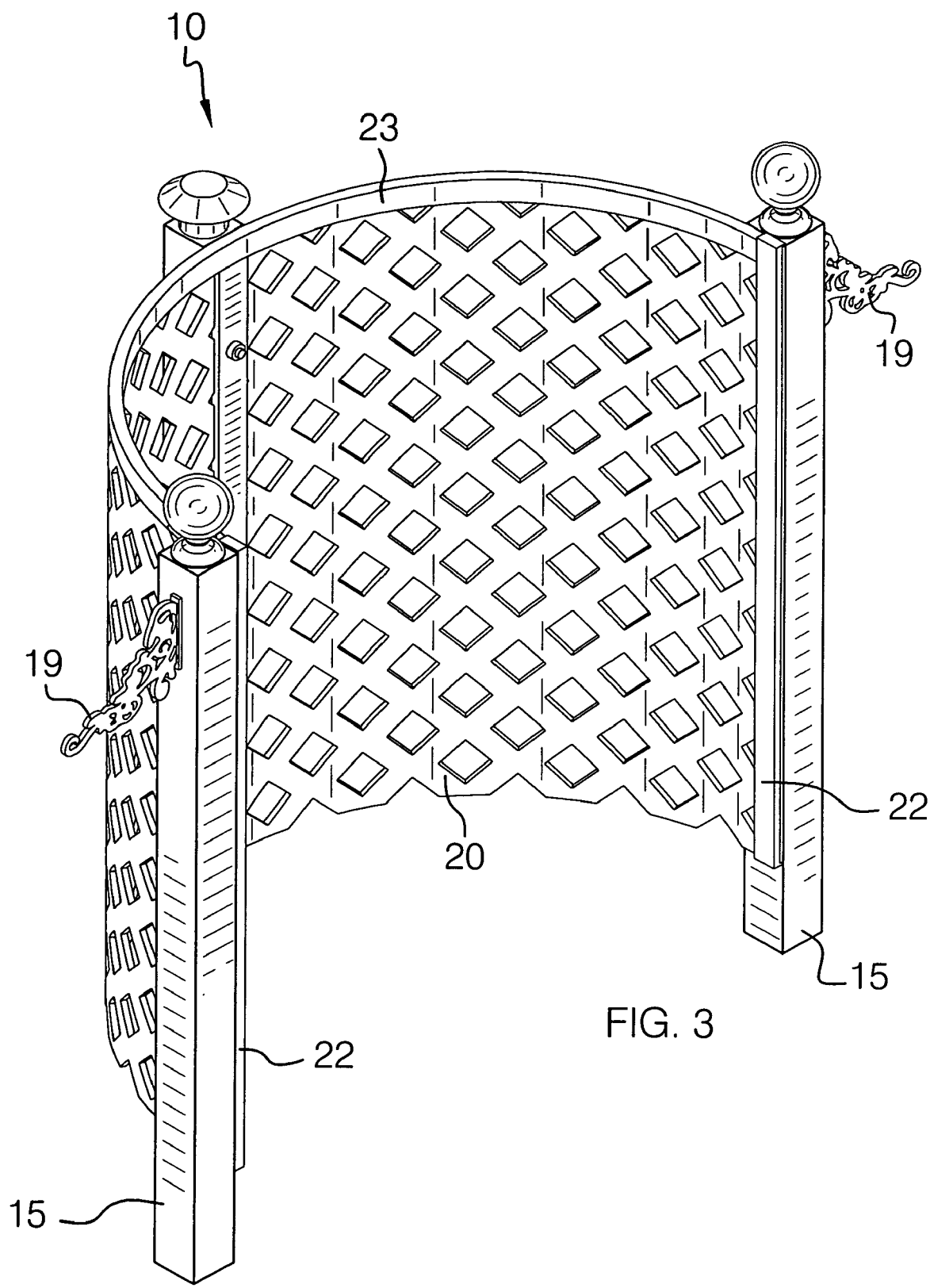
FIG. 3 illustrates an isometric view of the invention by itself.

Detailed reference will now be made to the preferred embodiment of the present invention, examples of which are illustrated in FIGS. 1-3.

An invention 10 is comprised of two front posts 15 having an ornate ball 16 or a solar-powered light 18 atop of each post. Attached near the top of each of the front post 15 is a plant hanger 19 that extends outward from the invention 10. The invention 10 also involves a plurality of rear posts or a single rear post 17, and wherein said rear post may have a solar-powered light 18 atop said rear post 17. Attached to the front posts 15 and the rear post 17 is a plurality of sheets of lattice 20. The lattice 20 is connected to rear post 17 by a fastening means comprising nails, screws, bolts, welding, or glue. The left and right sides of the lattice 20 are connected to the respective front post 15 by a support piece 22. The support piece 22 connects to the lattice 20 and front post 15 by a fastener comprising nails, bolts, wood screws, welding, or glue. A top support piece 23 runs the length of the top side of the lattice 20, and attaches to the front posts 15 and rear post 17. The top support piece 23 connects to the lattice 20, front posts 15, and rear posts 17, by a fastener comprising nails, bolts, wood screws, welding, or glue.

The lattice 20, front posts 15, and rear posts 17 are made of materials comprising wood, plastic, or metal. The invention 10 is constructed with a curvature that ranges from zero degrees to 180 degrees.

The inventor claims:

1. A landscaper trellis with integrated plant hangers and solar-powered light comprising:
   (a) a front left post and a front right post;
      wherein a plant hanger is attached adjacent a top, left corner of the front left post;
      wherein a plant hanger is attached adjacent a top, right corner of the front right post;
      wherein both the front left post and the front right post each have an ornate ball attached to the top;
   (b) a rear post wherein directly atop said rear post is a solar-powered light;
   (c) a layer of lattice which attaches to all of the posts;
   (d) a plurality of support pieces;
      wherein one of the support pieces secures a left side of the lattice to the front left post;
      wherein another one of the support pieces secures a right side of the lattice to the front right post;
   (e) a top support piece which runs the length of the top, with said front and rear posts being located exteriorly of said top support piece;
   wherein the front left post, front right post, and rear post form a triangle, such that the lattice, when attached, forms a curve.

2. The landscaper trellis of claim 1 wherein the front left post, the front right post, the rear post, and the lattice are made of materials comprising wood, plastic, or metal.

3. The landscaper trellis of claim 1 wherein lattice connects to the rear post by a fastening means comprising nails, screws, bolts, welding, or glue.

4. The landscaper trellis of claim 1 wherein the plurality of side supports and top support connect the lattice to the front left post, front right post, and rear post, respectively, by a fastening means comprising nails, screws, bolts, welding, or glue.

5. A landscaper trellis with integrated plant hangers and solar-powered light comprising:
 (a) a front left post and a front right post;
  wherein a plant hanger is attached adjacent a top, left corner of the front left post;
  wherein a plant hanger is attached adjacent a top, right corner of the front right post;
  wherein both the front left post and the front right post each have an ornate ball attached to the top;
 (b) a rear post wherein directly atop said rear post is a solar-powered light;
 (c) a layer of lattice which attaches to all of the posts;
 (d) a plurality of support pieces;
  wherein one of the support pieces secures a left side of the lattice to the front left post;
  wherein another one of the support pieces secures a right side of the lattice to the front right post;
 (e) a top support piece which runs the length of the top of the, with said front and rear posts being located exteriorly of said top support piece;
 wherein the front left post, front right post, and rear post, as positioned from overhead form an arc pattern, such that the lattice, when attached, forms a curve.

6. The landscaper trellis of claim 5 wherein the front left post, the front right post, the rear post, and the lattice are made of materials comprising wood, plastic, or metal.

7. The landscaper trellis of claim 5 wherein lattice connects to the rear post by a fastening means comprising nails, screws, bolts, welding, or glue.

8. The landscaper trellis of claim 5 wherein the side supports and top support connect the lattice to the front left post, front right post, and rear post, respectively, by a fastening means comprising nails, screws, bolts, welding, or glue.

\* \* \* \* \*